Figures 1, 6:
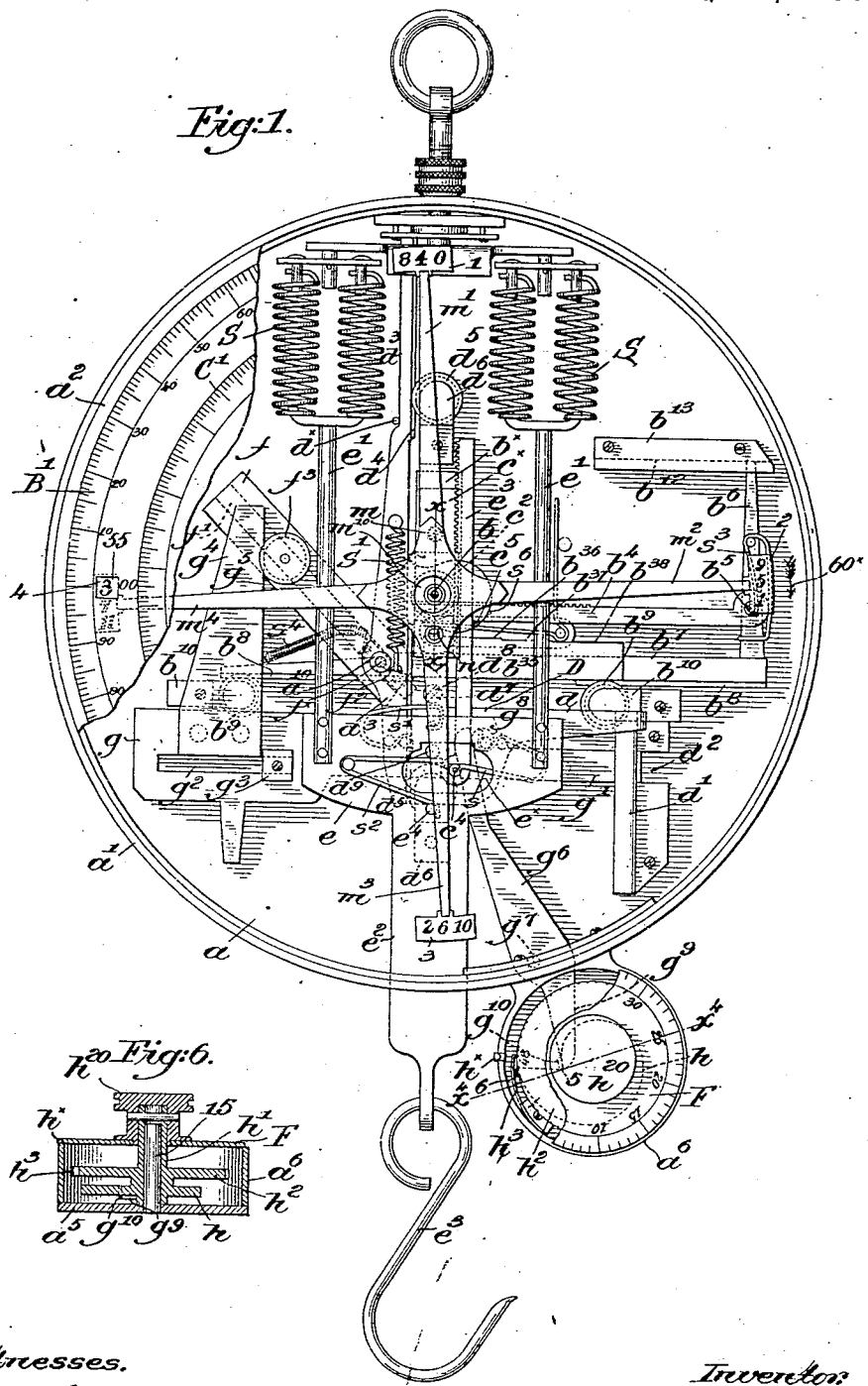

(No Model.)  H. E. SWIFT.  2 Sheets—Sheet 1.
PRICE-COMPUTING SCALE.
No. 542,970. Patented July 16, 1895.

Witnesses.
Fred S. Greenleaf
Thomas J. Drummond

Inventor:
Horace E. Swift,
by Crosby & Gregory
attys.

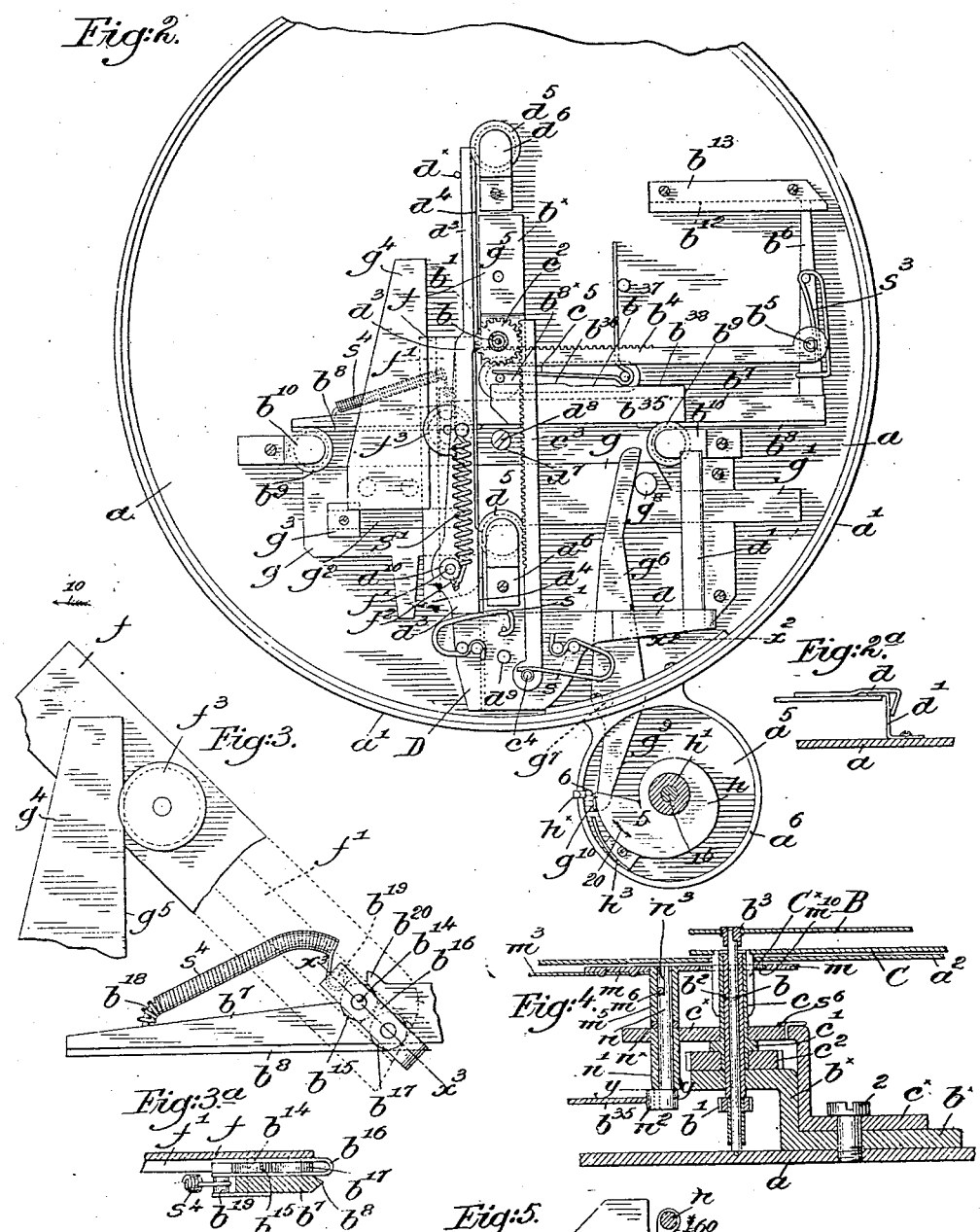

UNITED STATES PATENT OFFICE.

HORACE E. SWIFT, OF BOSTON, MASSACHUSETTS, ASSIGNOR TO T E JONES-SWIFT MANUFACTURING COMPANY, OF PORTLAND, MAINE.

PRICE-COMPUTING SCALE.

SPECIFICATION forming part of Letters Patent No. 542,970, dated July 16, 1895.

Application filed March 19, 1895. Serial No. 542,349. (No model.)

*To all whom it may concern:*

Be it known that I, HORACE E. SWIFT, of Boston, county of Suffolk, State of Massachusetts, have invented an Improvement in Price-Computing Scales, of which the following description, in connection with the accompanying drawings, is a specification, like letters and numerals on the drawings representing like parts.

This invention has for its object the production of a computing-scale which will accurately and quickly compute and indicate the aggregate price of an article for any and all unit prices at every increment of movement of the measuring mechanism.

In this present invention I have provided computing mechanism operable by movement of the measuring or weighing mechanism of the apparatus, a controlling member determining by its angular position the movement of the computing mechanism, while manually operated means fix the angularity of the controlling member according to the unit price of the article measured.

The number of units in the article measured and the computed price are herein indicated by rotatable pointers co-operating with two scales delineated on a suitable dial, the computed-price scale being shown as graduated in quadrants from zero to ninety-nine, representing cents, and at the zero-point of each quadrant is a sight-opening to display a dollars-indicator, movable beneath it in accordance with the computed price, as will be described, to increase the scope of the apparatus without enlarging it inordinately.

In accordance therewith, my invention consists in a price-computing apparatus containing the following instrumentalities, viz: weighing mechanism, computing mechanism operated by movement thereof, a controlling member carried by the weighing mechanism and to determine by its angular position the extent of movement of the computing mechanism, and means to manually move said member relative to its supporting mechanism, to fix its angularity, substantially as will be described; also, in a scale-indicating mechanism, including a rotatable hand or pointer, a dial having an aperture therein, a spring-actuated character-carrier beneath the dial and having one or more characters thereon, a detent therefor, and a cam-plate for and against which the detent rests, said detent and cam-plate regulating the movement of the character-carrier, the movement of said cam-plate by the mechanism which rotates the hand or pointer permitting proportional movement of the detent and character-carrier, substantially as will be described.

Other features of my invention will be hereinafter described, and particularly pointed out in the claims.

Figure 1, in elevation and partly broken out, represents a price-computing apparatus embodying my invention. Fig. 2, in elevation, represents the computing mechanism in inoperative position, the controlling member corresponding in position to zero unit price, the counterbalanced portion of the measuring mechanism being omitted and the pointer-operating devices thereof being shown in their extreme position. Fig. 2$^a$ is a sectional detail taken on the line $x^2 x^2$, Fig. 2, showing the guide $d'$ and engaging-arm $d$ in elevation. Fig. 3 is a detail, on a larger scale and partially broken out, of the controlling member and the engaging portion of the computing mechanism. Fig. 3$^a$ is a sectional detail on the line $x^3 x^3$, Fig. 3, the controlling member being shown in position. Fig. 4 is an enlarged sectional detail taken on the line $x x$, Fig. 1. Fig. 5 is a partial sectional view of the devices below the line $y y$, Fig. 4; and Fig. 6 is a sectional view taken on the line $x^4 x^4$, Fig. 1, of a portion of the means for fixing the position of the controlling member.

The operative mechanism is herein shown as inclosed in a casing composed of a back $a$, preferably circular side walls $a'$, and a face or dial $a^2$, (shown only in Figs. 1 and 4 and as largely broken out to show the mechanism underneath it,) the parts of the casing being connected in any suitable manner. A spindle $b$, having fast thereon the pinion $b'$, (best shown in Fig. 4,) is mounted in the back $a$ and in a tubular bearing $b^2$, rigidly held in a bracket $b^x$, secured to the back in suitable manner, as by a screw 2, the outer end of the spindle being extended through the face $a^2$ and slabbed off at $b^3$ to receive thereon the hub of a total price-indicating hand or pointer B, said hand being shown only in Fig. 4. A sleeve $c$, having a lateral flange $c'$ thereon, loosely surrounds the bearing $b^2$ and is extended through the arm $c^x$ of an auxiliary bracket mounted on the bracket $b^x$, the inner end of the sleeve resting on the outer side of the said latter bracket, and its outer end being adapted to receive thereon a split or spring hub $C^x$ of a weight-indicating hand or pointer C. (Shown only in Fig. 4.) The sleeve $c$ has fast thereon, between its flange $c'$ and the bracket $b^x$, a pinion $c^2$, the bearing $b^2$ thus serving for the spindle $b$ as an exterior bearing and for the sleeve $c$ as an interior bearing.

Referring now to Figs. 1 and 2, the pinion $c^2$ is shown as in engagement with and to be rotated by a rack $c^3$, preferably pivoted at $c^4$ to a carrier-plate D, to be described, a spring $s$ acting on a flattened portion of the pivot $c^4$ of the rack to force it toward the pinion $c^2$, while a pin $c^5$ prevents accidental disengagement of the rack and pinion. The carrier-plate D is provided with a laterally-extended arm $d$, suitably shaped at its outer end (see Fig. 2$^a$) to embrace a guide $d'$, secured to the back $a$, the foot of the said guide being cut away at $d^2$ for a purpose to be described. A long guide bar or arm $d^3$ is rigidly secured to or forms part of the carrier-plate D, extended in a direction parallel to the guide $d'$, the said arm having, as herein shown, preferably, knife-edge portions $d^4$ to bear against suitable friction-rolls $d^5$, rotatably mounted in the back, and brackets $d^6$ secured thereto, the friction-rolls $d^5$ being shown as peripherally grooved to receive the knife-edges $d^4$, whereby the carrier-plate and its arms are free to be moved in a right line toward or away from the center of the casing, a pin or stud $d^x$ insuring the maintenance of the knife-edges in engagement with the friction-rolls. A buffer-spring $s'$, mounted on the carrier-plate, is adapted to bear against a stop $d^7$, rising from the back $a$ and in the path of the plate to take up any shock which might be occasioned by a sudden release of said plate, as will be understood. The stop $d^7$ is slabbed off at its top to leave a diametrical rib $d^8$, (best shown in Fig. 2,) so that rotation of the stop in one or the other direction will turn said rib to permit a slight variation in the throw of the carrier-plate and its inward movement, motion in the opposite direction being positively stopped by the wall $a'$ of the casing.

It will be seen from an inspection of Figs. 1, 2, and 4 and from the foregoing that the rack $c^3$ will be reciprocated by movement of the carrier-plate D, thereby rotating the pinion $c^2$, and consequently the hand C will be moved for an angular distance proportional to the throw of the rack, movement of the rack from one to the other extreme being adapted to rotate the pinion $c^2$ once, so that the hand or pointer will traverse the scale $C'$ on the face or dial from zero to the highest point indicated on such scale.

The scale $C'$, herein shown, is divided to represent pounds and ounces.

Referring now to Fig. 1, a yoke $e$ is connected by rods $e'$ to suitable yoke-springs S, which latter are attached to the casing in usual manner, the reduced end $e^2$ of the yoke being extended through a suitable opening in the side wall of the casing diametrically opposite the point of adjustment of the springs, and provided with a hook or other suitable device $e^3$, whereby pressure applied to the hook will distend the springs, as is common in usual spring scales and balances.

The counterbalancing device, comprising the yoke and springs, is shown in Fig. 1 in its normal retracted position, and the yoke is connected to the carrier-plate D in a yielding manner by means of a stud $d^9$, rigidly secured to the said plate and projecting through an opening $e^x$ in the yoke, a bent spring $s^2$, held rigidly on the yoke at $e^4$, bearing with its free end against the stud $d^9$, the innermost edge of the opening $e^x$ acting upon said stud when the yoke is moved outwardly, the spring $s^2$ taking up lost motion between the carrier-plate and the yoke, when the latter returns to its normal position, and also obviating any shock which might occur were the counterbalancing device suddenly released from pressure.

The counterbalancing device, the rack and pinion $c^3$ $c^2$ and their connecting parts constitute measuring mechanism whereby, by its movement, the number of units in the article measured is indicated on the dial by the amount of angular movement of the hand C over the scale $C'$.

The arm $d^3$ of the carrier-plate has pivoted thereto on its underside a controlling member $f$, (shown as an arm,) longitudinally grooved upon its under face at $f'$, (see dotted lines in Figs. 1, 2, and 3,) the pin $f^x$ by which the controlling member is pivoted extending through a hub $d^{10}$ on the arm $d^3$, the hub being slotted in its side to permit the movement therein of a hooked lug $f^2$ on the pin $f^x$, a strong spiral spring S' being attached at one end to the lug and at its other end secured to the arm $d^3$, the tendency of said spring being to throw the controlling member $f$ in the direction of the arrow 10, Fig. 3.

The outward movement of the controlling member $f$, due to the action of the spring S', is counteracted and regulated by manually-operated means, adjustable according to the unit price of the article measured, to permit more or less pivotal movement of the controlling member, and thereby to fix its angular position.

A slide-plate $g$ rests on the inner side of the back $a$, and is reduced at $g'$ to form a tongue adapted to enter and be guided by the space $d^2$ in the foot of the guide $d'$, hereinbefore mentioned, the said slide-plate having a longitudinal slot $g^2$ therein, entered by a cut-under guide-block $g^3$ secured to the back, so that the slide-plate may be moved in the direction of its length. The plate has secured thereto, or forming a part of it, an arm $g^4$, the inner edge $g^5$ of which is preferably at right angles to the direction of movement of said plate, to engage the periphery of a preferably grooved friction-roll $f^3$ mounted on the upper side of the controlling member $f$, the said arm forming a stop to limit the throw of said arm, due to the action of the spring $S'$.

In Fig. 1 the plate $g$ is shown at that extreme end of its movement which will permit the greatest angularity of the controlling member $f$, and in Fig. 2 the plate is shown at the other extreme end of its path, the controlling member at such time being in parallelism with the path of movement of the measuring mechanism hereinbefore described, the angularity of the said member being reckoned from such path or line of travel as a base. A lever $g^6$, pivoted at $g^7$ to the casing, bears at one end against a projection $g^8$ (best shown in Fig. 2) on the slide plate $g$, the outer arm $g^9$ of the lever extending through the wall $a'$ of the casing and within a preferably circular chamber formed by the erection of a wall $a^5$ upon an extension $a^6$ of the back $a$, and covered by a dial F, (shown in Figs. 1 and 6, and partly broken out therein,) the wall $a^6$ being secured to the casing-wall $a'$ in any suitable manner, or it may be a part thereof.

The movement of the lever $c^6$ about its fulcrum is governed by a manually-operated device adjustable according to the unit price of the article to be measured, and consisting of a plate $h$ having an evolute periphery between the points 5 and 6, secured to an extended hub $h'$, rotatable about a post $l^5$, rigidly secured to the extension $a^6$, said hub being provided at its upper end with a suitable thumb-nut $h^{20}$, the dial-plate F being also secured to and to rotate with said hub and the evolute plate $h$.

The dial has suitable graduations thereon from zero to any desired number—forty-eight being shown—to indicate the price per pound of the article to be measured, the index-point $h^x$, secured to the wall $a^6$, being located adjacent to the periphery of the dial F.

The arm $g^9$ of the lever is upturned at $g^{10}$ to bear against the evolute periphery of the plate $h$, which latter has a pin or projection at the point 6 to bear against the upturned part $g^{10}$ of the lever when the plate has been rotated in the direction of the arrow 20 into the position shown in Fig. 2. Above the evolute plate I have secured to the hub $h'$ a disk $h^2$, (see Fig. 1,) notched at its periphery to correspond to the number of graduations on the dial F, said notches being engaged one at a time by a spring catch or finger $h^3$ to prevent accidental rotation of the evolute plate, the finger and the notched plate constituting a lock for the said devices.

It will be obvious from an inspection of Figs. 1 and 2 that rotation of the evolute plate from the position shown in Fig. 1 to that shown in Fig. 2 will swing the lever $g^6$ from one to another extreme of its movement and positively move the slide-plate from the position shown in Fig. 1 to the right into the position shown in Fig. 2, reverse rotation of the evolute plate permitting the lever $g^6$ to swing proportionally in the opposite direction, the slide-plate $g$ being moved at such time from right to left by and through the action of the strong springs $S'$, which at all times maintains the controlling member pressed against the arm $g^4$ on the slide-plate.

The unit price of the article being known, the operator will turn the thumb-nut $h^{20}$ until the proper graduation on the dial F is opposite the index-point $h^x$, such movement fixing the angularity of the controlling member $f$ by the intervening connections. The pinion $b'$ on the spindle $b$ is in mesh with the teeth of a rack $b^4$, pivoted at $b^5$ to a portion $b^6$ of the carriage, to be described, the pin or stud $c^6$ preventing disengagement of the rack and pinion, while a spring $s^3$, bearing on a flattened portion of the pivot $b^5$, presses the rack against the pinion in a yielding manner.

The carriage is shown as a bar $b^7$, extended laterally across the central line of the casing and beneath the rack $c^3$ and the bracket $b^x$, said carriage being preferably provided with knife-edges $b^8$ to engage the grooved peripheries of the friction-rolls $b^9$, rotatable in brackets $b^{10}$ and the back $a$, while the outer end of the arm $b^6$ slides in an undercut guideway $b^{12}$ in a plate $b^{13}$ on the back, the carriage thus being supported at three points and movable with very little friction, a spring-controlled roll $b^{8x}$ acting upon the bar $b^7$ to keep the same in engagement with the rolls $n^9$. It is obvious that as the carriage is moved from the position shown in Figs. 1 and 2 to the other end of its path the rack $b^4$ will rotate the pinion $b'$ a number of times, depending upon the number of teeth in the rack and pinion, the number being herein shown such as to rotate the pinion three times for the full movement of the carriage from right to left.

The carriage $b^7$ has pivoted thereon at $b^{14}$ (most clearly shown in Fig. 3) a roll $b^{15}$ to enter the groove $f'$ in the under side of the controlling member $f$, the said groove and the inner or pivoted end of said member being shown by the dotted lines in Fig. 4 in order to show more clearly and distinctly the parts underneath, now to be described. The pivot $b^{14}$ has mounted thereon between the top of the roll $b^{15}$ and the bottom of the groove $f'$ a plate $b^{16}$, preferably bent over at one end, as best shown in Fig. $3^a$, and having rotatably mounted therein a second roll $b^{17}$, also entering the groove in the controlling member, the diameter of the rolls being greater than the width of the plate $b^{16}$. A spring $s^4$ is connected at one end to a preferably bent pin $b^{18}$ on the carriage, and at its other end is attached to a stud $b^{19}$ on the plate, the normal tendency of the spring being to turn the plate on its pivot $b^{14}$ to press the roll $b^{17}$ against the lower side of the groove $f'$, the roll $b^{15}$ engaging its upper side, thereby lessening the friction and increasing the freedom of movement of the parts. A shoulder $b^{20}$ on the bar $b^7$ is adapted to act against the stud $b^{19}$ when the controlling member is in the position shown in Fig. 2 to act as a positive stop therefor.

It will be obvious from the foregoing that the movement of the measuring mechanism is transmitted to the carriage by or through the controlling member, movable with one, and the rolls $b^{15}$ $b^{17}$, movable with the other, and the extent of movement of the carriage will be controlled by the angular position of the controlling member $f$—that is to say, if the said controlling member is parallel to the path of movement of the measuring mechanism, as shown in Fig. 2, no movement whatever will be transmitted to the carriage, as the controlling member will move up and down past the rolls $b^{15}$ $b^{17}$; but if the angularity of the controlling member is changed to any position between the position shown in Figs. 2 and 1 the bodily movement of the controlling member will cause a corresponding movement of the carriage, the path of the carriage being at right angles to the path of the measuring mechanism, and the greater the angularity of the controlling member the greater the movement of the carriage.

The carriage, together with the rack $b^4$ and pinion $b'$, constitute computing mechanism to compute the aggregate price of the article measured according to the unit price, the movement of the computing mechanism being determined by the angular position of the controlling member, said controlling member being manually fixed as to its angularity by means of the evolute plate and the intervening connections, as described.

The computed price is indicated upon the dial-face $a^3$ by the hand B co-operating with the graduations B'. The greater the movement of the carriage the greater the sweep of said hand or pointer.

It will be noticed that the apparatus herein shown is constructed on the right-line principle, the carriage forming part of the computing mechanism moving at right angles to the path of movement of the measuring mechanism, and the movement of said carriage is the resultant of two forces applied respectively in the path of movement of the measuring mechanism and in the direction of the groove in the controlling member.

For convenience in indicating the price after the hand or pointer B has made one revolution the scale B' is divided into four equal parts, and each quadrant is graduated to represent one hundred cents, so that a price of four dollars will be indicated when the hand has made one complete revolution.

It is obvious that the numbers from 1 to 4 could be placed upon the dial, one at the highest division of each quadrant; but inasmuch as the hand can make three complete revolutions it would be inconvenient for the operator to add mentally the number of dollars after the first revolution. So, too, if the numbers from 1 to 12 were displayed on the dial in succession at the quadrantal points confusion would arise as to the selection of the proper one to be read. To obviate these objections I have made a series of apertures 55 in the dial at the quadrantal points, one such aperture being shown in Fig. 1, and I have provided means to automatically display at the apertures single numbers or characters in accordance with the movement of the hand B, the characters herein shown representing dollars.

Referrings to Figs. 1 and 4, four arms $m'$, $m^2$, $m^3$, and $m^4$ are secured to a base $m$, ninety degrees apart, a hub $m^5$ on the base slipping onto a spindle $n$, slabbed off at $n^3$ to receive a pin $m^6$ within the hub, so that said hub and spindle will rotate together but may be readily separated. The base $m$ has an opening $m^{10}$ therein, through which the supporting parts of the hands B and C pass, and permitting movement of said base on its pivotal point. Each arm is enlarged beneath its adjacent aperture 55, as at 1, 2, 3, and 4, respectively, and I have herein shown the characters indicated upon such enlarged portions, the said characters being the numbers 1 to 11, inclusive, and 0 arranged in groups of three, as shown in Fig. 1, the lower number in each group being at the leading end of the enlargement. The apertures 55 are large enough to display one number at a time, and it will be evident that by moving the character-carrier, composed of the base $m$ and its arms step by step a different number will be displayed at an aperture for each step of movement. On the enlargement 1 the numbers are 0, 4, and 8, on 2 the numbers 1, 5, and 9, and so on for the other two arms. The spindle $n$ is mounted in a sleeve-bearing $n'$, fast in the bracket $c^x$, (see Fig. 4,) an annular collar $n^x$, secured to the spindle, resting on the top of the bracket, and a pawl $n^2$, fast on on the spindle $n$, is held against the cam-edge of a plate $b^{35}$ by means of a light bow-spring $s^6$, connected at one end to the collar $n^x$ and fastened at its other end to the bracket $c^x$, the spring tending to turn the spindle and the character-carrier in the direction of the arrow 60, Fig. 5, and arrow $60^x$, Fig. 1.

Normally the position of the character-carrier is shown in Fig. 1, the 0 and the numbers 1, 2, and 3 being displayed at the apertures 55, and such position will be maintained for any price up to three dollars and ninety-nine cents—that is, for one revolution of the hand B—for the part $b^{36}$ of the cam-plate $b^{35}$ is long enough to act upon the pawl $n^2$, while the computing mechanism is being moved to indicate such price.

The cam-plate is shown as secured to a part of the computing mechanism movable in a right line, herein shown as the bar $b^7$. When the price is four dollars or over, the cam-plate $b^{35}$ will be moved until the lower part $b^{37}$ is opposite the pawl $n^2$, permitting rotative movement of the spindle $n$ as the pawl moves from $b^{36}$ to $b^{37}$, and this movement is enough to advance the character-carrier one step, displaying the numbers from 4 to 7, inclusive, at the apertures 55 for any price between four dollars and seven dollars and ninety-nine cents indicated by the second revolution of the hand B. A price of eight dollars or more will move the cam-plate until the lowest portion $b^{38}$ is opposite the pawl $n^2$, permitting the last advance of the character-carrier and displaying the numbers from 8 to 11, inclusive, for the third revolution of the hand and indicating price up to eleven dollars and ninety-nine cents. When the bar $b^7$ resumes its normal position the return movement of the cam plate $b^{35}$ automatically resets the character-carrier step by step, the pawl $n^2$ being moved from part $b^{38}$ to $b^{37}$ and then to $b^{36}$, the shoulders between the parts being rounded or inclined to allow it.

The spring $s^6$ acts to rotate the character-carrier whenever allowed to do so, the pawl $n^2$ acting as a detent, as it were, to limit the action of the spring $s^6$, while the cam-plate $b^{35}$ operates as a releasing device, in this instance controlled by the movement of the computing mechanism.

While I have herein shown the scale B' divided quadrantally with corresponding apertures and the character-carrier as movable in accordance therewith, my invention is not restricted to such construction, for the dial may be provided with one or more apertures according to the division of the scale and the number of revolutions which the indicating-hand co-operating therewith may make, and the character-carrier will be so operated and controlled as to display one or more characters at an aperture.

While I have herein shown the character-carrier as applied to a scale in connection with the price-computing mechanism it is not restricted thereto, for the principle may be used with other mechanism—as measuring or weighing mechanism, for instance—when it is desired to more conveniently read the indications of the hand or pointer.

In another application, Serial No. 542,339, filed by me the 19th day of March, 1895, I have shown and described and broadly claimed a computing-scale containing weighing mechanism, computing mechanism operatively-connected to and actuated thereby, a controlling member to determine by its angular position the extent of movement of said computing mechanism, and manually-operated means to fix the angularity of said controlling member, and accordingly such subject-matter is not broadly claimed herein.

I claim—

1. In a price computing scale, weighing mechanism; computing mechanism operated by movement thereof; a controlling member carried by the weighing mechanism and to determine by its angular position the extent of movement of the computing mechanism; and means to manually move said member relative to its supporting mechanism, to fix its angularity, substantially as described.

2. In a price computing scale, weighing mechanism, including a carrier-plate movable in a right line; computing mechanism operated by the movement of said carrier-plate; a controlling member pivotally connected to said plate; a connection between said weighing and computing mechanisms, movable along said member; and means to turn said member on its pivot to adjust its angle relative to the path of movement of the carrier-plate, to thereby fix the path of said connection, substantially as described.

3. In a price computing scale, weighing mechanism; a controlling member movable therewith; means to fix the angularity of said member relative to the path of movement of said mechanism; computing mechanism, including a carriage movable in a right line; and a moving connection between said carriage and controlling member, to move the the computing mechanism in a given ratio to the measuring mechanism, substantially as described.

4. In a price computing scale, weighing and computing mechanisms, each including a pinion and a spring-controlled rack in mesh therewith; a controlling member connecting said mechanisms and determining by its position the relative movements thereof; means to manually fix the position of said member; and visual indicators actuated by said weighing and computing mechanisms respectively, to indicate the weight and price of an article, substantially as described.

5. In a price computing scale, weighing and computing mechanisms; a controlling member connecting them and determining by its position the extent of movement of the computing mechanism; a graduated unit price dial, locking plate, and evolute shaped actuator, connected to be simultaneously rotated; and connections intermediate said actuator and controlling member, to fix the position of the latter according to the unit price of the article, substantially as described.

6. In a price computing scale, a carrier-plate movable in a right line; a counterbalancing device connected thereto, and having an interposed spring to take up shock; an adjustable stop to limit the inward movement of the carrier-plate, and a buffer on said plate, substantially as described.

7. In a scale, indicating mechanism, including a rotatable hand or pointer; a dial having a plurality of apertures therein and graduated equally intermediate said apertures; a character carrier beneath the dial and having separated series of characters thereon, one of said series being adjacent each aperture; and means controlled by the movement of said indicating mechanism to automatically display at each aperture a character of its particular series corresponding to the rotative movement of the hand or pointer, substantially as described.

8. In a scale, indicating mechanism, including a rotatable hand or pointer; a dial having an aperture therein; a spring-actuated character-carrier beneath the dial and having one or more characters thereon; a detent therefor, and a cam plate for and against which the detent rests, said detent and cam plate regulating the movement of the character-carrier, the movement of said cam plate by the indicating mechanism permitting proportional movement of the detent and character carrier, substantially as described.

9. In a price computing scale, weighing mechanism; computing mechanism operated by movement thereof; a controlling member to determine by its position the extent of movement of the computing mechanism; means to fix the position of said member; a dial having an aperture therein; a spring actuated character carrier having one or more characters thereon adapted to be displayed at said aperture; and means actuated by said computing mechanism to automatically permit proportional movement of said character carrier to display a character at the aperture, substantially as described.

In testimony whereof I have signed my name to this specification in the presence of two subscribing witnesses.

HORACE E. SWIFT.

Witnesses:
JOHN C. EDWARDS,
MARGARET A. DUNN.